April 21, 1931. E. A. JOHNSTON ET AL 1,802,021
COTTON PICKER
Filed Feb. 9, 1927   6 Sheets-Sheet 1

Inventors
E.A. Johnston
D.B. Baker and
D.R. Ike,
By H.P. Dalgleish
Atty.

April 21, 1931.　　E. A. JOHNSTON ET AL　　1,802,021
COTTON PICKER
Filed Feb. 9, 1927　　6 Sheets-Sheet 5

Fig. 8.

Inventors.
E. A. Johnston,
D. B. Baker, D. R. Ake
By W. P. Doolittle
Atty.

April 21, 1931.  E. A. JOHNSTON ET AL  1,802,021
COTTON PICKER
Filed Feb. 9, 1927  6 Sheets-Sheet 6

Inventors.
E. A. Johnston,
D. B. Baker and
D. R. Ike,
By R. P. Suolate
Atty.

Patented Apr. 21, 1931

1,802,021

UNITED STATES PATENT OFFICE

EDWARD A. JOHNSTON, DAVID B. BAKER, AND DECKER R. AKE, OF CHICAGO, ILLINOIS, ASSIGNORS TO INTERNATIONAL HARVESTER COMPANY, A CORPORATION OF NEW JERSEY

COTTON PICKER

Application filed February 9, 1927. Serial No. 166,829.

This invention relates to cotton pickers of the type employing rotating picker stems which are projected into cotton plants so that the mature cotton may be wound thereon. In the operation of the machine, picker stems are then withdrawn from the plants and the cotton is removed.

An object of the invention is to improve the structure and operation of the cotton picker of the type above mentioned.

A further object of the invention is to provide a novel and practical means for stripping the cotton from the devices by which it is picked.

It is also an object of this invention to provide a novel and successful cotton picker having cotton picking devices, stripping devices, and cotton delivery means, all associated in a novel manner so as to constitute an important part of a successful cotton picker.

An embodiment of the invention is illustrated in the accompanying drawings, in which—

Figure 2:
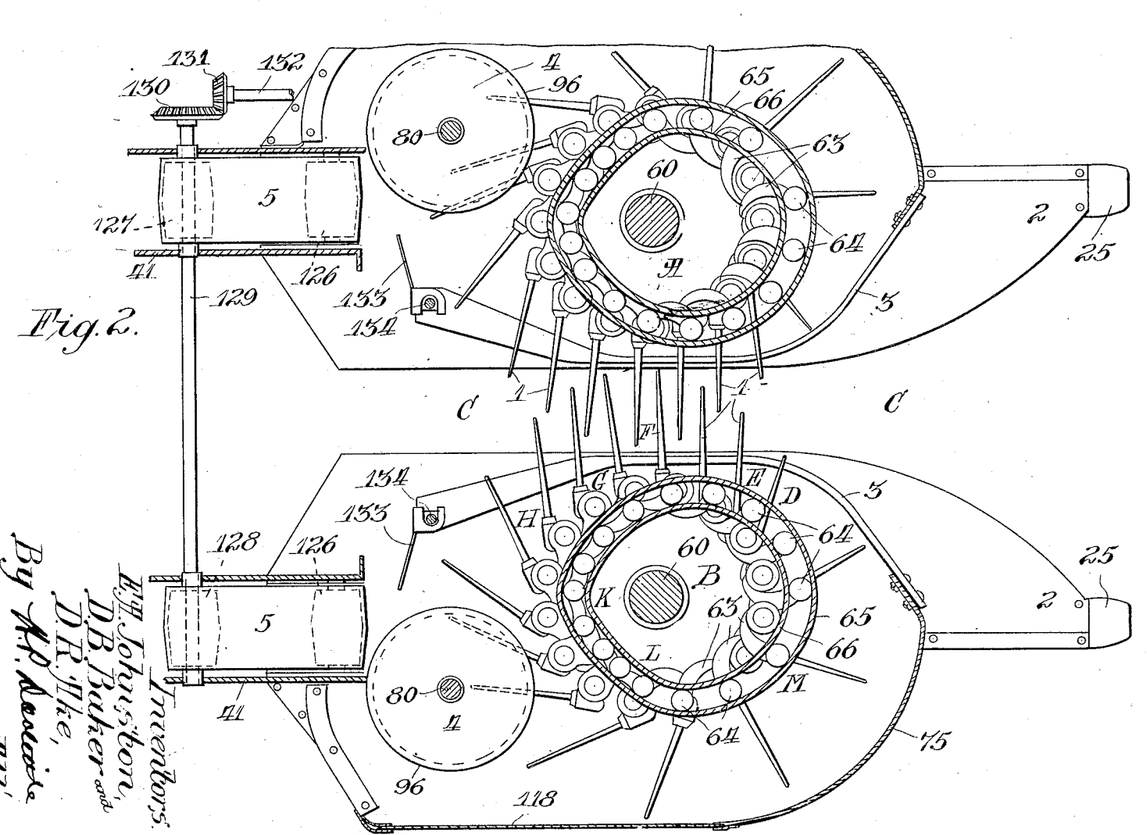
Figure 2 is a somewhat schematic plan view showing the arrangement of the cotton picking devices including the picker stems, the strippers or doffers, and the elevators to which the cotton is delivered by the doffers.

The illustrative cotton picker employs rotating picker stems 1 which are projected into cotton plants and rotated so as to wind the cotton thereon. These picker stems are thereafter withdrawn from the plants and the cotton is stripped or doffed therefrom. As illustrated in Figure 2 of the drawings, there are two batteries of picker stems, A and B, respectively. These batteries are located upon opposite sides of a plant passage-way. The cotton plants are guided into this passage-way by gathering platforms 2 which preferably run close to the ground so as to pick up low lying branches of the plants and lift them to such a position that they may be acted upon by the picker stems. Rearwardly of the gathering platforms 2, the plants are guided into the passage-way C and preferably compressed therein by curved compressor bars 3. The picker stems 1 are moved between the compressor bars 3 as they are projected into the cotton plants and withdrawn therefrom. Each picker stem moves in an endless course, as is indicated in Figure 2 of the drawings. After it is retracted from the passage-way C, each stem passes between doffers 4, which preferably move longitudinally of the picker stem so as to strip the cotton therefrom and throw it directly upon elevators 5.

Figure 1:
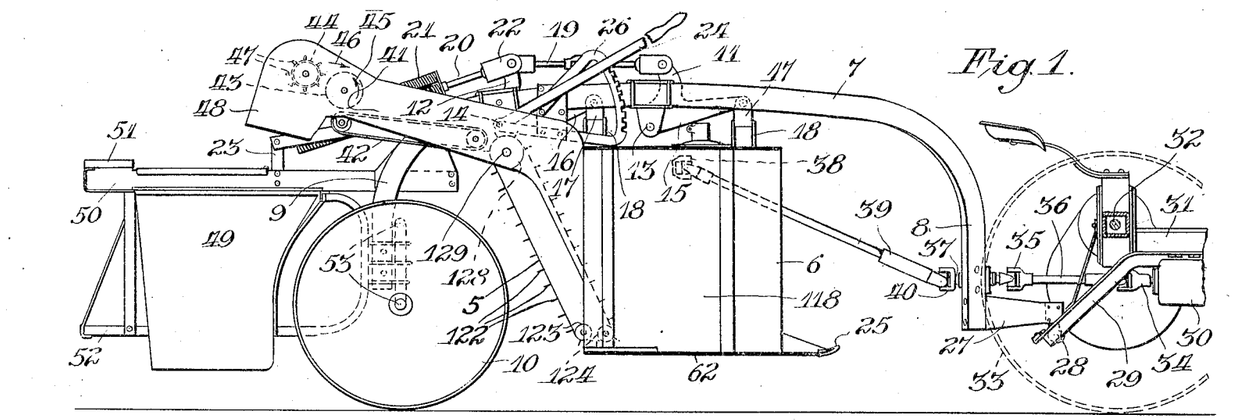
Figure 1 is a side elevation of the cotton picker, showing it connected to a tractor.

The picker mechanism above referred to is constructed as a unit such as that illustrated at 6 in Figure 1 of the drawings. This unit is preferably swingably supported beneath a frame 7 arranged in a fore and aft direction so as to embody the forward leg 8 and the rearward leg 9. The machine shown is a direct connected cotton picker having its forward end supported upon a tractor. Supporting wheels 10 are provided at the rear of the cotton picker.

The mid-portion of the frame 7 has pivoted thereto a forward bell crank lever 11 and a rear bell crank lever 12, the respective pivotal supports of these levers being indicated at 13 and 14, respectively. The forwardly extending ends 15 and 16 of the bell crank levers pivotally support the picker mechanism 6 by means of yokes 17 and 18. The lower yokes 18 are preferably pivoted to the picker mechanism by pivot members which extend longitudinally of the machine and are coaxial. The upper ends of the bell crank levers are connected by a turnbuckle 19 the adjustment of which advantageously varies the inclination of the picker mechanism. A counter-balancing device 20 herein shown as comprising spiral springs 21 is connected by means of a yoke 22 to the bell crank lever 12, the other end of the counter-balancing device being secured to a fixed portion of the machine herein shown as the standard 23.

In Figure 1 of the drawings, the picker mechanism is shown in its elevated position. When the machine is to be operated, the picker mechanism is lowered by means of a hand lever 24 which preferably acts directly upon the pivot member 14 to move both of the bell cranks 11 and 12. In case it is desired to allow the picker mechanism to ride along the surface of the ground, the runners 25 advantageously guide it and prevent interference with the progress of the machine by accumulations of earth in front of it. The picker mechanism may be held in any desired vertical position by appropriate detent mechanism coacting with the segmental rack 26.

The forward end of the frame of the illustrative machine is provided with a draft connection 27 pivotally supported at 28 by an extension 29 of a tractor; the transmission 30, the frame 31, the rear axle 32, and the driving wheels 33 of the tractor being indicated in the drawing. The tractor is also provided with a power take-off shaft 34 extending rearwardly from the transmission 30. This power take-off shaft is connected by means of power transmitting devices 35 and 36 with a drive shaft 37 preferably journaled in the forward end of the frame 7. The operating parts of the picking mechanism 6 are driven by power transmission connections 38, 39 and 40, which so unite the picker mechanism 6 with the drive shaft 37 that the picker mechanism may be constantly driven regardless of its swinging motion with respect to the frame 7 and regardless of its vertical position with respect to that frame or to the ground. The foregoing briefly describes the general organization covered by copending patents to Johnston et al. 1,727,708 and 1,727,709 issued September 10, 1929.

Figure 1 of the drawings shows a rearwardly extending casing 41 which, in this instance, is preferably unitarily combined with the picker mechanism 6. The casing 41 houses the elevator 5, the conveyer 42, and the carding roller 43, together with its blower and ejector 44. The carding roller 43 operates in the direction of the arrow 45 so as to lift cotton from the conveyer 42. The cotton is then carried to the upper part of the casing 41 where it is acted upon by a current of air developed by the blower 44. This current of air operates to separate bits of leaves and other trash from the cotton, the latter being held by the carding roller until it is batted therefrom by the blades 47 of the blower. The direction of the blast of air from the blower 44 is indicated by the arrow 46. The cotton is batted by the blower 44 through the downwardly extending chute 48 and into easily detachable baskets or receptacles 49 preferably slidably supported by a rearward extension 50 of the frame of the cotton picker. The extension 50 of the frame preferably supports platforms 51 and 52 for the accommodation of the attendant. The supporting wheels 10 are preferably connected by an arched axle 53, the legs of which are bolted to the members of the frame 7.

Referring again to Figure 2 of the drawings, and in order to make the operation of the picker stems clear, attention is called to the fact that the picker stems move in orbital paths, the picker stem at position D being about to enter the passage-way C wherein it is held stationary with respect to plants in the passage-way. As the picker mechanism, as an entirety, is moved forward, the picker stem must move from the position D rearwardly along a compressor bar 3 to the position E and the succeeding rearward positions. When the picker stem is moved from position D to position F, it is substantially fully projected within the passage-way C, and in that position it presents its greatest picking surface to the cotton. From the position F, the picker stem moves through the succeeding positions G and H until it approaches the doffers 4 in the tangential manner which is clearly illustrated in Figure 4 of the drawings. The doffers are moving in the direction indicated by the arrow 54 so that their exterior portions move substantially longitudinally of the picker stem, thus promoting effective stripping of cotton from the picker stems by reason of the fact that the doffers tend to push and throw the cotton from the picker stem, the cotton being first acted upon by two adjacent doffer members which cooperate to produce effective stripping.

Figure 8:
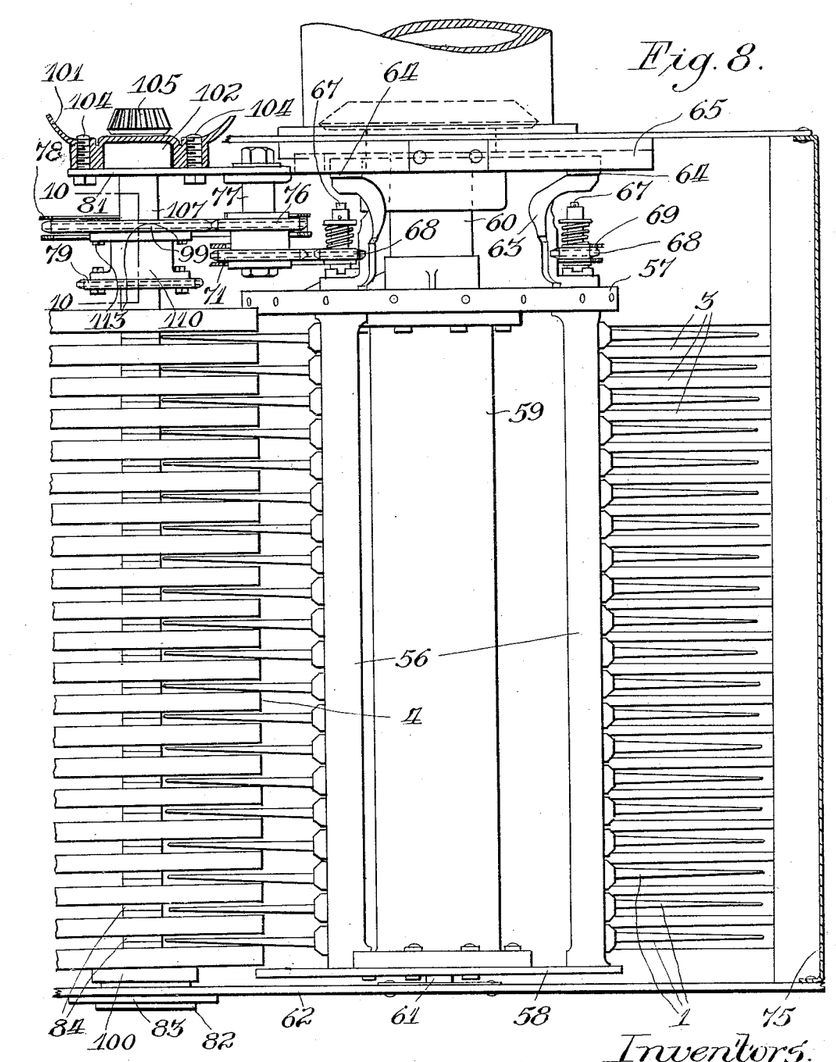
Figure 8 is a side elevation of the picker mechanism of the illustrative machine, showing the relationship of the picker stems to the doffers.

In the illustrative machine the picker stems are carried in separate vertical series. Each vertical series is composed of vertically aligned picker stems rotatably supported by an upright carrier herein shown as a picker bar 56. Figure 8 particularly shows the arrangement of the picker bars and picker stems. The picker bars are arranged in drum formation extending from an upper head 57 to a lower head 58, in both of which the picker bars are rotatably supported. The heads 57 and 58 are connected by a central column 59 preferably rigidly secured to each head. The entire arrangement of elements just mentioned will be hereinafter referred to as a "picker drum". It will be understood that there is a picker drum on each side of the passage-way C and that each drum is rotated by a shaft 60 so as to carry the picker stems around in their endless paths, which are indicated in Figure 2 of the drawings. In order that each picker drum may be held properly centered with respect to the surrounding casing and with respect to the doffers 4, a suitable pilot bearing 61 is located in the bottom wall 62 of the casing.

The picker bars are of hollow cylindrical formation and are rigidly associated at their upper ends with cam arms 63 upon the upper ends of which are cam rollers 64 which are guided between the outer cam track 65 and the inner cam track 66.

As a picker stem moves from position D in Figure 2 toward the position E, the curvature of the cam tracks, the forward speed of the vehicle, and the rate of rotation of the picker drum are so related that the tip of the picker stem remains in substantially the same line running transversely of the passage-way C; that is, the point of the picker stem does not advance or retrogress in the plants when the machine as an entirety is moving forwardly. At the same time the angle of the picker stem is being constantly changed so that as the picker stem comes to the position F it extends substantially directly across the passage-way C and has substantially all of its effective picking surface exposed to the plants within the passage-way.

Figures 3, 4:
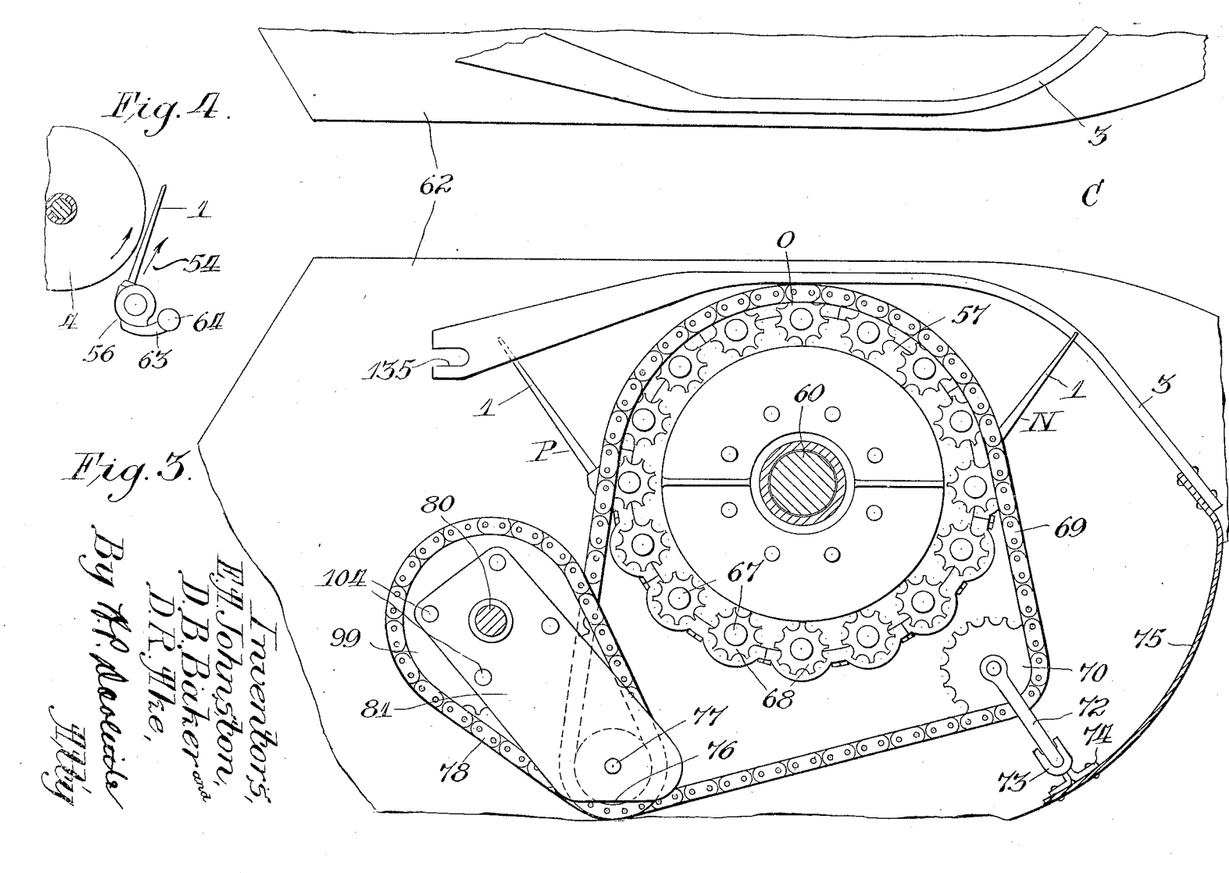
Figure 3 is a view somewhat in the nature of a plan illustrating the manner in which the doffer shaft is employed to drive the shafts which transmit power to the picker stems.
Figure 4 is a partly diagrammatic view illustrating the relation of a picker stem to the doffers as it is about to pass between them.

As a picker stem moves from the position F to the position G and on to the position H, it is gradually retracted from the passage-way C and its angle of extension is gradually changed until it approaches the doffers 4 so as to be related thereto in a tangential manner and with mid-portions of the spindles first presented thereto, as indicated in Figure 4 of the drawings.

The cam tracks 65 and 66 are so arranged that immediately after a picker stem comes into tangential contact with the doffers it is rather abruptly retracted in the direction of its length so as to present the effect of pulling the picker stem through the doffers in order to promote effective stripping. The section of the cam track K—L is rather sharply angled with respect to the adjacent portions of the tracks so as to produce such sharp retraction while a picker stem is passing through the stripping zone. The section K—L of the track may be, therefore, termed the doffer or stripping zone section of the track.

From position L, and extending through the position M to the position D, the cam tracks are of such gradual curvature as to prevent such irregular movements of the picker stems as would result in whipping of the stems and their consequent breakage.

Figure 3 of the drawings is a view looking down upon the top of a picker drum, particularly disclosing the arrangement of the picker bars relative to the drum and the manner in which the picker bar shafts 67 are driven. Each shaft 67 extends vertically through a picker bar and is rotatably mounted therein, suitable gearing being provided between each shaft 67 and each one of the picker stems carried by the associated picker bar. At the top of each shaft 67 is non-rotatively secured a driving element herein shown as a sprocket wheel 68. As the drum is rotated to cause a sprocket wheel 68 to move from the position N through the position O to the position P, in Figure 3, the sprocket wheel is rotated by reason of contact with an endless chain 69. This chain is preferably held out of contact with the sprocket wheels during the remainder of the travel of the drum by an idler sprocket 70 and by a counter-shaft sprocket wheel 71. The idler sprocket 70 is supported by a pivoted arm 72 attached by members 73 and 74 to the picker drum casing 75.

The endless chain 69 is driven by the sprocket wheel 71 by reason of its non-rotative connection to a second counter-shaft sprocket gear 76, both of these sprocket wheels being rotatively mounted upon a depending counter-shaft 77. The sprocket wheel 76 is driven by an endless chain 78 trained around a sprocket wheel 99 rotating with the doffer shaft 80. For the purpose of taking up slack in either of the sprocket chains 69 and 78, the sprocket wheel 71 may be adjustably mounted in its supporting plate 81. The picker drum structure and drive form the subject matter of copending patent to Johnston et al. 1,737,850 issued December 3, 1929.

Figure 5:
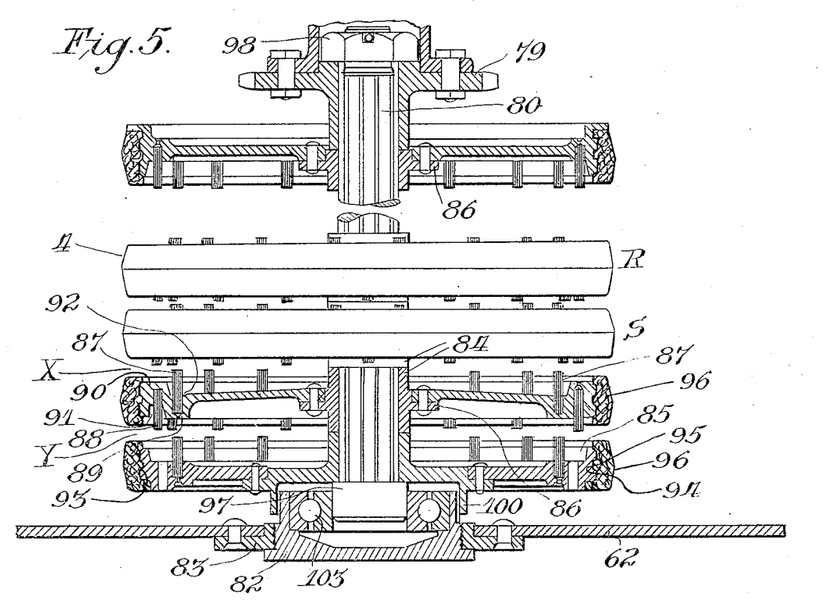
Figure 5 is partly a side elevation and partly a central vertical sectional view of the doffer or stripper mechanism also illustrating the structure of the devices for cleaning the picker stems as the cotton is stripped therefrom.
Figure 6:
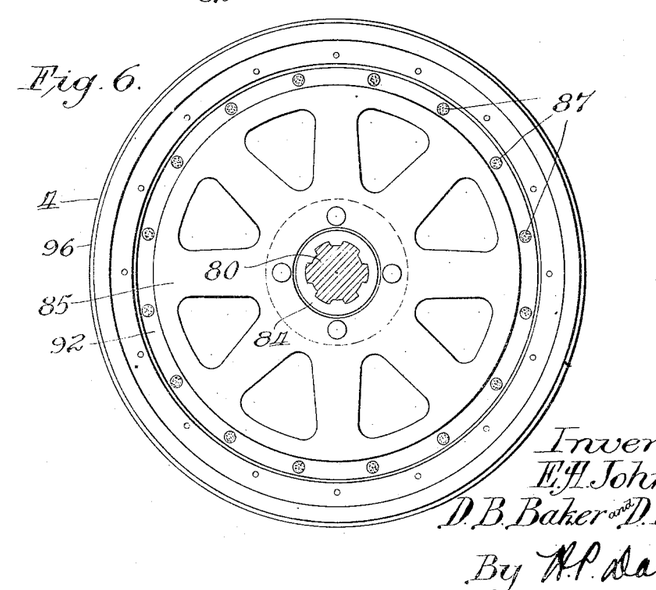
Figure 6 is a plan of one of the units of the doffer structure shown in Figure 5.
Figure 7:
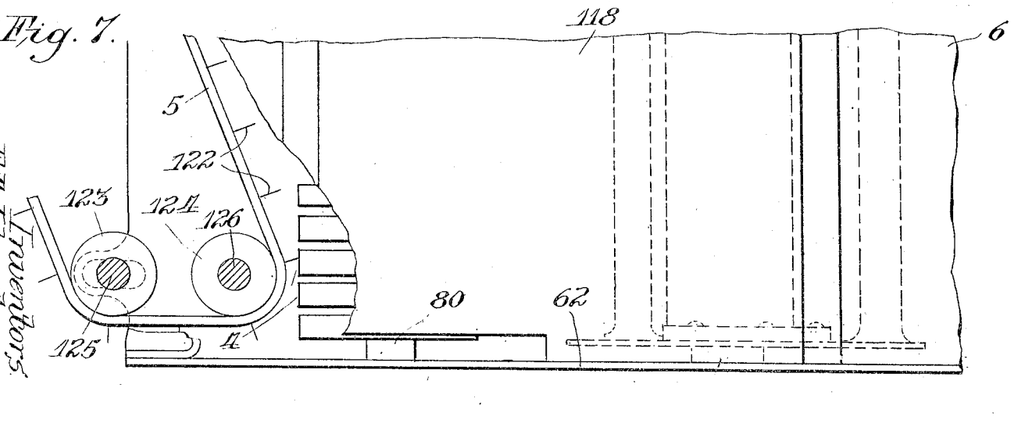
Figure 7 is a partial side elevation of a part of the picker mechanism illustrated in Figure 1, showing in part the relationship of the doffer to the elevator.

The structure of the illustrative doffer is particularly well shown in Figures 5 and 6 of the drawings. As here illustrated, the doffer is composed of a plurality of horizontally disposed disk-like structures assembled upon the shaft 80. This shaft is splined throughout its length, as clearly indicated in Figure 5. The assembly of the various disk-like structures is thus facilitated because of the fact that they may be slid into position and be held accurately located by the splines of the shaft. The pilot bearing 82 for holding the doffer shaft correctly centered is moved in a screw threaded and shouldered ring 83 secured to the bottom wall 62 of the picker mechanism casing.

Each of the disk-like structures of the doffer comprises a hub 84 and a disk or annular member 85 rigidly secured to a flange 86 upon the hub 84. It is important that the picker stems be continuously cleaned during the operation of the machine on account of the fact that various gummy and sticky plant juices adhere to the picker stems and interfere with the winding up of the cotton upon the picker stems as well as with the stripping of the cotton from the picker stems. Such interference of the operation of the machine is prevented in this instance by substantially continuously acting cleaning devices herein shown as brushes 87. These brushes are mounted in a circular series in each member 85. This arrangement is well shown in Figure 6 of the drawings. By mounting two circular series of such brushes in each disk, as indicated in Figure 5 of the drawings, each unit of the doffing and cleaning mechanism is acting upon two horizontal series of picker stems at the same time. As the brushes 87 are acting upon picker stems within the passage-way X, brushes 88 extending from the same disk are acting upon picker stems going through the passageway Y.

For the purpose of providing adequate support for the brushes 87 and 88, each disk 85 is preferably constructed with reinforced or thickened circumferential ribs 89 and 90, these ribs having annular grooves 91 and 92, respectively, formed therein for the purpose of affording adequate flexibility of the respective brushes 88 and 87. Because of the continuous and drastic service demanded of the brushes they are preferably constructed of material forming very stiff bristles. Under some conditions stiff metallic wire is used.

It will be noted from an inspection of Figure 5 of the drawings that all of the brushes 87 and 88 extend beyond the horizontal confines of the disk-like structures in which they are mounted. In other words, they extend into the various passage-ways between the disk-like structures. This arrangement promotes effective cleaning of the picker stems going through the passageways, and it also fosters long life of the brushes by reason of the fact that they are thus made of sufficient length to have the requisite flexibility. As will be indicated by an inspection of Figure 2 of the drawings, a plurality of brushes in each disk-like structure is acting upon a given picker stem at any certain time in the operation of the machine. The brushes are moved substantially lengthwise of the picker stems during a part of their course of movement, and are thereafter moved transversely of the picker stems so as to carry away any gummy deposits which may have been made on the picker stems. This action upon the picker stems also results in buffing and polishing of the picker stems, thereby giving them a clean and glistening surface for minimizing undesirable sticking of the cotton upon the picker stems.

It will also be noted that the brushes in the superposed disk-like structures are not in vertical alignment or in directly superposed positions. This is shown clearly in the illustration of the intermediate disk-like structures R and S in Figure 5. The brushes extending downwardly from the unit R are vertically offset with respect to the brushes extending upwardly from the unit S. It is important in the assembling of the units upon the shaft 80 that they be placed in such a manner that the brushes have the described arrangement. This arrangement has many advantages, one of which is the minimizing of the resistance which the doffing and cleaning mechanism offers to the passage of the picker stems therethrough. If the brushes of the respective units were placed in directly superposed positions, the resistance which they would offer to the passage of the picker stems between the units would tend to materially slow up or stop the operation of the machine.

Externally of the ribs 89 and 90, each disk-like structure provides an anchoring annulus 93 which is formed with a central groove 94 for receiving a rib 95 preferably formed integrally with the peripheral band 96. For effective operation under many conditions the bands 96 are formed of fibrous material possessing sufficient resiliency to prevent injury to the cotton or to the picker stems as they pass through the units of the doffer mechanism. Under such circumstances the bands 96 may be readily removed from the disks 85 when they become worn. It is thus an easy matter to maintain the doffer mechanism in good operative condition. Inasmuch as the bands 96 are formed on arcs having a diameter relatively great with reference to the effective lengths of the picker stems, the parts of a band in contact with a picker stem immediately after the stem enters the passage-way between respective units of the doffer move substantially lengthwise of the picker stem so as to be most effective in stripping the cotton. In this manner the force exerted by those parts is acting substantially directly opposite to the line of greatest resistance which the wound-up cotton presents to the doffer.

As illustrated in Figure 5, the lower end of the doffer shaft 80 is formed with an enlarged portion or abutment 97. This structure is advantageous in the assembly of the complete doffing mechanism. This assembly may be conveniently made before the doffer mechanism or any of its parts are placed in the casing for the picker mechanism. In assembling the doffing mechanism, the shaft 80 is held in upright position and the lowermost disk-like structure is slipped down over the shaft until its hub strikes against the abutment 97. Thereafter the remaining part of the doffer may be similarly slid down along the shaft 80 until all of them are in place. Thereupon the sprocket wheel 79 with its extended hub is placed at the top of the assembly and all of the various parts are tightened in position by the turning of a nut 98 threaded upon the upper end of the shaft 80. The entire assembly then may be placed as a unit within the casing for the picker mechanism. After the unit is in proper position above the member 83, the member 82 is threaded into position, its upper portion extending into an annular protective socket formed by the downwardly extending annular flange 100 upon the lowermost disk-like structure of the doffer.

For the purpose of avoiding the concentration of excessive weight upon the lower wall 62 of the casing of the illustrative machine, and for the purpose of facilitating the removal of the entire doffer mechanism for repair, adjustment, or replacement, the doffer is shown to be supported from a position above its upper end. The extreme upper support illustrated in Figure 8 of the drawings is a member 101. Within the downwardly opening socket in this member is a bearing 102 preferably similar to the pilot bearing 103 which is shown in Figure 5 at the lower end of the doffer structure. This bearing 102 is held in position by the plate 81 secured to the member 101 by cap screws 104. A beveled gear 105 is located above the member 101 as illustrated in Figure 8 of the drawings and is mounted upon the shaft 106 indicated in Figure 10 of the drawings. This shaft is enclosed by a sleeve 107 forming the upwardly extending hub of the sprocket wheel 99 and preferably abutted against the plate 81. The sprocket wheel 99 is secured upon a shaft 106 by a nut 108 threaded upon the lower end of the shaft.

Figures 9, 10:
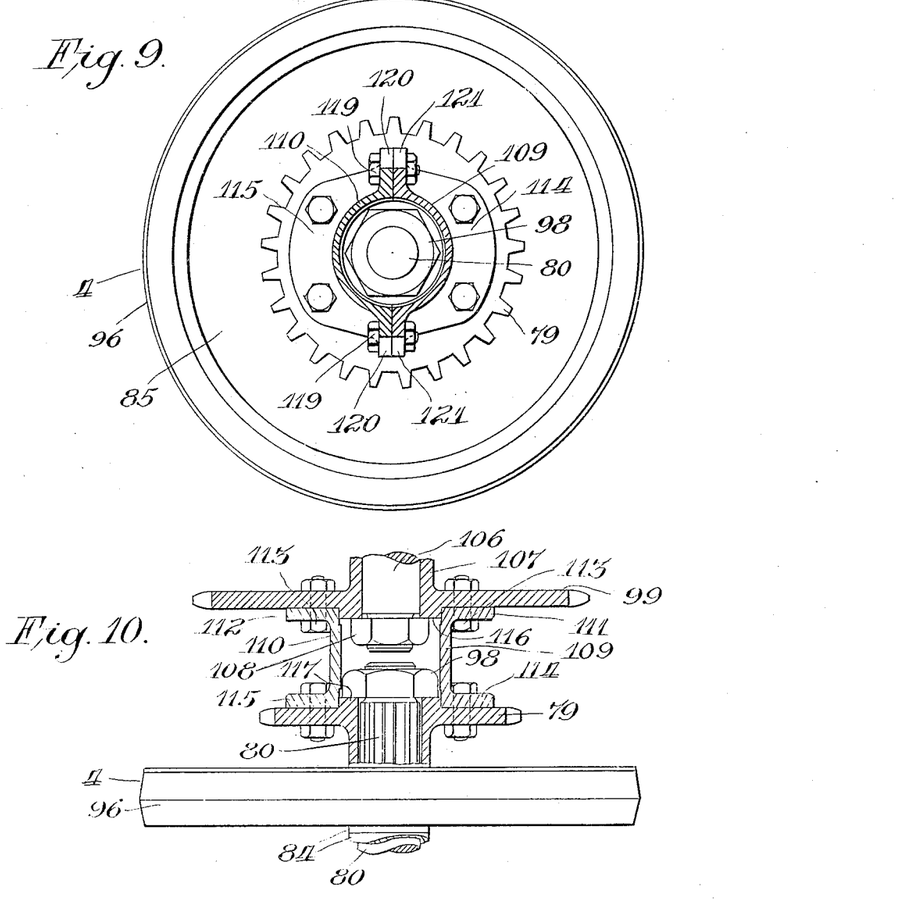
Figure 9 is a plan view of the structure shown in Figure 5 of the drawings, disclosing particularly a part of the removable connections at the upper end of the doffer.
Figure 10 is partially a side elevation of the doffer unit and partially a vertical section upon the section line 10—10, as indicated in Figure 8 of the drawings.
Figure 11:
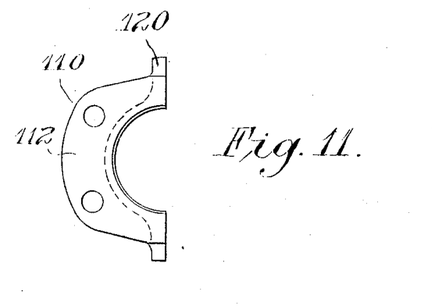
Figure 11 is a detail view showing one of the split sleeve elements for hangingly supporting the doffer from above.

The sprocket wheel 79 at the upper end of the doffer shaft 80 is secured to the sprocket wheel 99 in a manner indicated in Figures 9 and 10 of the drawings. There are shown two split sleeve members 109 and 110. These members have outwardly extending flanges 111 and 112 lying against the under surface of the sprocket wheel 99 and secured to the sprocket wheel by bolts 113. Similar flanges 114 and 115 at the lower ends of the sleeve members are secured to the sprocket wheel 79 in the manner clearly indicated. Central raised portions 116 and 117 of the sprockets 99 and 79 respectively fit tightly within the bore of the split sleeve construction so as to accurately center the doffer shaft 80 with respect to the driving shaft 106.

When it is desired to move the doffer structure from the illustrated machine the vertically sliding wall or panel 118 (see Fig. 2) is withdrawn upwardly from the picker mechanism casing. The structure at the upward end of the doffer is then exposed so that a workman has suitable access thereto. The bolts 119 are withdrawn from abutting flanges 120 and 121 and then the bolts passing through the sprockets 79 and 99 are removed. This frees the upper end of the doffer structure. Next, the member 82 is turned so as to move it downwardly through the bottom wall 62 of the picker mechanism. The entire doffer structure may then be removed by withdrawing it laterally through the opening afforded by the removal of the wall or panel 118.

As the arrangement of elements is illustrated in Figure 2 of the drawings, the doffers operate to throw the cotton directly backwardly upon the elevators 5. These elevators are preferably provided with pins or spikes 122 in order that they may remove all of the cotton from the vicinity of the doffer. The elevators herein shown are endless belts, each belt preferably passing around two lower rollers 123 and 124 mounted respectively on shafts 125 and 126. For the purpose of maintaining the endless belt in the desired condition as to tautness, the shaft 125 is preferably adjustably mounted so that the roller 123 may be moved backwardly to take up any slack in the belt.

At their upper ends the elevators 5 are trained around driving rollers or pulleys 127 and 128, preferably non-rotatively mounted upon the same drive shaft 129. This drive shaft receives power from the shaft 132 through the bevel gears 130 and 131.

The guards 133 serve to prevent the escape of cotton from the casing. These guards are preferably held in position by means of vertical rods 134, which are fixedly mounted in the upper and lower walls of the casings for the picker mechanisms. The compressor bars 3 are preferably slotted at their rearward ends, as indicated at 135 so that they may straddle the rods 134 and be frictionally held in their correct spaced relationships by any preferred clamping means.

While the invention has been described with reference to the disclosure of a particular machine, it is to be understood that the invention is not limited thereto, but that it is of a scope commensurate with the scope of the subjoined claims.

What is claimed as new is:

1. A cotton picker comprising, in combination, picker stems, vertically extending picker bars carrying the picker stems, a carrier for supporting the picker bars, means for operating the carrier so as to move the picker bars and the picker stems in an endless course, means for rotating the picker stems while they are in contact with the cotton plants, an oppositely rapidly rotating doffer for stripping and centrifugally discharging cotton from the picker stems, said doffer comprising horizontally moving spaced disk-like members having peripheral stripping elements, and means for varying the angular positions of the picker stems as they enter between the members of the doffer to present the stems thereto in substantially tangential relationship to the curved path in which the stripping elements move and with midportions of the stems first presented for engagement.

2. A cotton picker comprising, in combination, a main frame, an auxiliary frame, picker stems carried by the auxiliary frame, means for mounting the picker stems in batteries between which the cotton plants pass, a plurality of vertically arranged picker bars carrying the picker stems in each battery, a vertically aligned series of picker stems carried by each picker bar, means for moving the picker bars in an endless course, a cam cooperating with the above mentioned means to project the picker stems across the passage traversed by the cotton plants, said cam also acting to withdraw the picker stems from that passage after the cotton is wound upon the picker stems, a doffer arranged adjacent each battery of picker stems, said doffer comprising a plurality of vertically spaced members between which the picker stems are caused to pass, means for rapidly moving the doffer members so that their peripheral portions will move substantially lengthwise of the picker stems as the latter enter the spaces between adjacent members, and means located within the doffer for cleaning the picker stems as the latter pass between the members.

3. A cotton picker comprising, in combination, picker stems, means for rotating the picker stems, means for moving the picker stems in an endless course, a cam acting in conjunction with the moving means for projecting the picker stems into the cotton plants and withdrawing them therefrom, and a doffer for stripping the cottom from the picker stems, said doffer comprising vertically spaced disk-like structures between which the picker stems pass, each of said disk-like structures having a removable peripheral stripping band.

4. A doffer for cotton pickers comprising disk-like structures having oppositely extending metallic brushes for cleaning picker stems after the cotton has been removed therefrom, said structures being surrounded by detachable bands of resilient material anchored to the peripheries of the disks.

5. A doffer for cotton pickers comprising a vertical shaft, disk-like structures mounted upon separate hubs keyed to the vertical shaft, metallic brushes projecting from the faces of the disks, and detachable bands of resilient material on the peripheries of the disks.

6. In a machine of the class described, a doffer for removing cotton from picker mechanism, said doffer comprising a series of superposed disk-like structures, one of two adjacent disk-like structures having brushes mounted therein and extending upwardly in a direction substantially parallel to the axis of the upright shaft, the other of the two structures having an annular band secured thereto and so as to extend from the surface of that structure toward the brushes of the adjacent structure.

7. A cotton picker comprising, in combination, picking mechanism including picker stems, means for rotating the picker stems on their own axes, a carrier supporting the picker stems and actuable to move the picker stems bodily in an endless path, rotating disk-like doffers for removing cotton from the picker stems at one position of their path, a shaft carrying the doffers in spaced relationship, means for moving the carrier so as to move the picker stems between adjacent doffers, means for imparting angular movement to the picker stems as the picker stems pass between adjacent doffers to initially present the picker stems on lines substantially tangential to the peripheries of the doffers, and means for rotating the doffers in a direction lengthwise of and substantially opposite to the movement of the picker stems as the picker stems are passing between the doffers.

In testimony whereof we affix our signatures.

EDWARD A. JOHNSTON.
DAVID B. BAKER.
DECKER R. AKE.